United States Patent Office 2,820,713
Patented Jan. 21, 1958

2,820,713

MORTAR COMPOSITIONS

Herman B. Wagner, Perkasie, Pa., assignor to Tile Council of America, Incorporated, a corporation of New York No Drawing. Application March 2, 1956
Serial No. 568,992

11 Claims. (Cl. 106—93)

This invention relates to an improved mortar, the principal ingredient of which is Portland cement and, more particularly, to an improved mortar composition especially suitable for filling the joints between the porous edges of ceramic tile which has been installed dry. This mortar may also be used for other purposes such as pointing brickwork, forming setting beds to which ceramic tile may be affixed in the dry state, and for bonding compositions for terrazzo, cinder block and the like.

A conventional method of installing ceramic wall tile is to set it in a bed of a cementitious adhesive and then to fill the joints with a pointing composition. These pointing compositions have generally comprised Portland cement as the principal ingredient, with enough water added to make a paste of proper consistency. Ceramic wall tile, however, is commonly manufactured with at least two of the four edges in a porous state. If this type of tile is pointed with the usual paste type pointing composition, unless the tile is previously soaked thoroughly in water, water is drawn out of the paste, the cement does not set properly, and the joints formed are soft and chalky. To avoid this unwanted result it is common practice in making ceramic wall tile installations to first soak the tile in water. The soaking of the tile is an extra step which adds to the time necessary to make the installation and therefore adds to the cost.

Ceramic tile pointing compositions comprising Portland cement and water also have another disadvantage which is more difficult to overcome. Immediately after the installation is made, water begins to evaporate from the surfaces of the joints and unless the humidity at the site of the installation kept above a certain minimum, water loss is so high that, again, the Portland cement does not set properly and soft and chalky joints may result. If an attempt is made to overcome this water loss by increasing the proportion of water in the mortar, the mortar becomes too thin to work properly and may not even be retained in the joints completely, especially if the installation is over head. High water-mortar ratio also leads to cracking due to excessive shrinkage of the mortar during curing.

Besides having the property of sufficient water retention, it is also highly desirable for pointing composition mortars to have proper working consistency, good adhesive properties, and proper hardness after setting. A good pointing mortar should not require too long a time to harden, nor exhibit undue shrinkage in the hardened or set condition. It is desirable for mortars used for brick pointing or for setting terrazzo to possess some or all of these same properties to more or less degree.

One object of the present invention is to provide an improved mortar composition that is particularly suitable for filling the joints between the porous edges of ceramic tile which has been installed dry.

Another object of the present invention is to provide an improved mortar composition exhibiting a relatively low rate of water loss while setting, having good working consistency, and also having proper hardness when set.

The foregoing objects and others are achieved by the improved mortar compositions of the present invention which comprise Portland cement as their principal ingredient, methyl cellulose of medium to high viscosity grade, and an alkaline earth metal polysulfide. In a preferred form, the compositions include a combination of a Bunte salt and an alkaline earth metal polysulfide. The compositions may also include other ingredients such as hardening accelerators like calcium chloride, whiteners and other pigments such as titanium dioxide, sand, and anti-shrinking agents such as aluminum metal. The dry compositions are mixed with water just prior to use to form mortars which may be used for a variety of purposes.

In these compositions the methyl cellulose increases the viscosity of the water slurries and this increase greatly retards the flow of water from the slurry into the pores of the tile. Also, a film or skin is formed at the exposed surface of the slurry which decreases the rate of evaporation of the water from the slurry to the atmosphere.

The percentage of methyl cellulose with respect to the amount of Portland cement, and the amount of water in relation to the weight of the dry mixture vary somewhat depending upon the use to which the mortar is to be put. There is also a definite relationship between the amount of methyl cellulose used and the viscosity grade chosen.

Methyl cellulose of medium to high viscosity grades is used in the compositions of the present invention. The viscosity may range between about 80 and 6,000 centipoise as measured in a 2% solution. The amount of methyl cellulose used may vary from about 0.25% to 2.25% with respect to the amount of Portland cement. However, if viscosity grades near the upper end of the range are used, the amount used should be near the lower end of the proportion range given above, and vice versa. The exact viscosity grade-amount ratio will depend upon the consistency desired as well as degree of hardness and length of curing time desired. If too high a proportion of methyl cellulose is used or if the combination of viscosity grade and weight is too high, curing time of the mortar becomes longer than is desirable and the resultant joint may be water sensitive. On the other hand, too small an amount of methyl cellulose or too small an amount in combination with too low a viscosity grade, produces compositions which are not suitable for uses such as installing ceramic wall tile in the dry state, since water loss from the mortars is too rapid.

An alkaline earth metal polysulfide or such a sulfide in combination with a Bunte salt is another essential component of the compositions of the present invention. By a Bunte salt is meant an alkyl or aryl ester of an alkali metal thiosulfuric acid. The lower aliphatic hydrocarbon esters such as ethyl-, propyl-, and butyl-, or ethylene-, butylene-, or propylene-, are preferred. If aryl esters are used, the simpler members of the series, such as the phenyl ester, are preferred. Any of the alkali metals, sodium, potassium, lithium, cesium, or rubidium, may be utilized in these salts. Where the polysulfide alone is used the amount is about 0.4% to about 4.5% with respect to the weight of Portland cement. The presence of the polysulfide has been found to retard the rate at which water is absorbed from the mortar into the pores of masonry set in or pointed with the mortar, and, through reaction with the Bunte salt, to provide a film at the air-joint interface.

When the combination of Bunte salt and polysulfide is used the amount should be about 2% to 10% with respect to the weight of Portland cement. With respect to the porportion of the two ingredients that make up the combination, the ratio of the Bunte salt to polysulfide should not be higher than about 3 to 1 and is preferably about 2 to 1.

Although it is not desired to limit the invention by the following explanation of how the mixture of Bunte salt and polysulfide functions to retard water absorption by the porous tile or other masonry and also to retard water loss by evaporation, a polymerization reaction occurs between the two ingredients in which long chain polymeric molecules are formed by linking of the alkyl or aryl groups by sulfur atoms. The polymer is dispersed in the liquid phase of the mortar and acts not only to block the pores of the tile or other masonry units, but to form a surface film which greatly retards water loss by evaporation.

The use of both the methyl cellulose and the combination of Bunte salt and polysulfide has been found to give better results than either one alone. Where methyl cellulose alone is used to retard water loss, the mortar in the joints is sometimes not as hard as might be desired. When the Bunte salt-polysulfide combination is included the mortar joints not only have improved hardness but the mortar also has better working qualities due to the presence of the methyl cellulose.

Another advantage in using both methyl cellulose and the combination of Bunte salt and alkaline earth metal polysulfide (or polysulfide alone) is that smaller amounts of the more expensive methyl cellulose can be used without detracting from the improved qualities of the resulting mortar joints.

Although the above mentioned additives can be used without any further ingredients in making mortar mixes with greatly improved curing properties it is sometimes desired to speed up the hardening action. Sometimes the curing reaction is so slow that difficulty is experienced in cleaning the tile face at the end of the tile-setting operation. Since it is usually not desirable to carry out the cleaning step until hardening of the joints is fairly complete, to speed up the hardening reaction it has been found advantageous to include hardening accelerators such as calcium chloride in the compositions. Where this ingredient is used, an amount may be employed up to about 2% with respect to the weight of Portland cement. The larger the amount of calcium chloride used, the faster the curing rate.

In preparing mortars out of any of the compositions of the present invention not containing sand, water is added in the proportion of about 30% to 40% of the weight of the dry mix. Usually the preferred amount is about 35%. Where sand is included, as in mortars suitable for setting or pointing bricks or masonry blocks, the sand may be present in a ratio of as high as 4:1 with respect to Portland cement and a larger proportion of water is used. With increasing amounts of sand, correspondingly larger proportions of water are utilized ranging up to about 55% to 60% based on the total amount of cement and sand.

In order to prevent excessive shrinking of the mortar in the joints while curing, which results in the pulling away of the mortar from the edges of the tile and cracking, a small amount of aluminum metal, preferably of the order of a few hundredths of one percent, may also be included in the mix. Whitening or other coloring pigments, such as powdered titanium dioxide, may also be included if desired.

The following are specific examples of mixes that may be used in accordance with the present invention:

(In all of the following examples percentages of all ingredients other than the Portland cement are based on the weight of the Portland cement.)

1

Portland cement.

| | Percent |
|---|---|
| Methyl cellulose (4000 centipoise grade, as determined in 2% solution) | 0.75 |
| Bunte salt (bis-beta chloroethyl ether ester of sodium dithiosulfuric acid) | 2.7 |
| Calcium polysulfide | 1.3 |
| Calcium chloride | 1.5 |
| Powdered aluminum | 0.02 |

Mixed with 35% of its weight of water.

2

Portland cement.

| | |
|---|---|
| Methyl cellulose (400 centipoise grade) | 1.25 |
| Bunte salt (same as Example 1) | 2.7 |
| Calcium polysulfide | 1.3 |
| Titanium dioxide pigment | 3.0 |
| Calcium chloride | 0.8 |
| Powdered aluminum | 0.02 |

Mixed with 35% of its weight of water.

3

Portland cement.

| | |
|---|---|
| Methyl cellulose (100 centipoise grade) | 1.5 |
| Bunte salt (ethylene ester of potassium dithiosulfuric acid) | 2.4 |
| Calcium polysulfide | 1.3 |
| Titanium dioxide | 3.5 |
| Calcium chloride | 0.8 |
| Powdered aluminum | 0.02 |

Mixed with 35% of its weight of water.

4

Portland cement.

| | |
|---|---|
| Methyl cellulose (400 centipoise grade) | 1.25 |
| Bunte salt (propylene ester of sodium dithiosulfuric acid) | 2.6 |
| Barium polysulfide | 1.4 |
| Calcium chloride | 2.0 |

Mixed with 30% of its weight of water.

5

Portland cement.

| | |
|---|---|
| Methyl cellulose (100 centipoise grade) | 1.5 |
| Bunte salt (butylene ester of lithium dithiosulfuric acid) | 2.6 |
| Strontium polysulfide | 1.4 |
| Calcium chloride | 2.0 |

Mixed with 30% of its weight of water.

6

Portland cement.

| | |
|---|---|
| Methyl cellulose (100 centipoise grade) | 1.5 |
| Calcium polysulfide | 2.0 |
| Calcium chloride | 2.0 |

Mixed with 30% of its weight of water.

Having thus described the invention what is claimed is:

1. A composition capable of being mixed with water to form a mortar and comprising Portland cement as its principal ingredient and the following ingredients in percentages based on the weight of the cement: methyl cellulose having a viscosity between about 80 and 6,000 centipoise in 2% solution, about 0.25% to 2.2%; and an alkaline earth metal polysulfide about 0.4% to 4.5%.

2. A composition according to claim 1 in which methyl cellulose has a viscosity of 100 centipoise and is present in an amount of about 1.5%, and in which said alkaline earth metal is calcium.

3. A composition according to claim 2 in which said polysulfide is present in an amount of about 2%.

4. A composition capable of being mixed with water to form a mortar and comprising Portland cement as its principal ingredient and the following ingredients in percentages based on the weight of the cement: methyl cellulose having a viscosity between about 80 and 6,000 centipoise in 2% solution, about 0.25% to 2.2% and a mixture of a material selected from the class consisting of alkyl and aryl esters of an alkali metal thiosulfuric acid and an alkaline earth metal polysulfide about 2% to 10%, the ratio of said ester to polysulfide in said mixture being between about 1.8:1 and about 3:1.

5. A composition according to claim 4 in which said ester is derived from an aliphatic hydrocarbon having up to four carbon atoms per molecule.

6. A composition according to claim 5 in which said ester is the ethylene ester of potassium dithiosulfuric acid.

7. A composition capable of being mixed with water to form a mortar and comprising Portland cement as its principal ingredient and the following ingredients in percentages based on the weight of the cement: methyl cellulose having a viscosity between about 80 and 6,000 centipoise in 2% solution, about 0.25% to 2.2%; and a mixture of a material selected from the class consisting of alkyl and aryl esters of an alkali metal thiosulfuric acid and an alkaline earth metal polysulfide about 2% to 10%, the ratio of said ester to polysulfide in said mixture being about 2:1.

8. A composition according to claim 7 in which said methyl cellulose has a viscosity of about 4,000 centipoise and is present in an amount of about 0.75%.

9. A composition capable of being mixed with water to form a mortar and comprising Portland cement as its principal ingredient and the following ingredients in percentages based on the weight of the cement: methyl cellulose having a viscosity between about 80 and 6,000 centipoise in 2% solution, about 0.25% to 2.2%; a mixture of a material selected from the class consisting of alkyl and aryl esters of an alkali metal thiosulfuric acid and an alkaline earth metal polysulfide about 2% to 10%, the ratio of said ester to polysulfide in said mixture being between about 1.8:1 and about 3:1; and up to about 2.5% calcium chloride.

10. A composition capable of being mixed with water to form a mortar and comprising Portland cement and the following ingredients in percentages based on the weight of the cement: methyl cellulose having a viscosity between about 80 and 6,000 centipoise in 2% solution, about 0.25% to 2.2%; a mixture of a material selected from the class consisting of alkyl and aryl esters of an alkali metal thiosulfuric acid and an alkaline earth metal polysulfide about 2% to 10%, the ratio of said ester to polysulfide in said mixture being between about 1.8:1 and about 3:1; up to about 2.5% calcium chloride; and up to about 400% sand.

11. A composition capable of being mixed with water to form a mortar and comprising Portland cement, and the following ingredients in percentages based on the weight of the cement: methyl cellulose having a viscosity between about 80 and 6,000 centipoise in 2% solution, about 0.25% to 2.2%; a mixture of a material selected from the class consisting of alkyl and aryl esters of an alkali metal thiosulfuric acid and an alkaline earth metal polysulfide about 2% to 10%, the ratio of said ester to polysulfide in said mixture being between about 1.8:1 and about 3:1; up to about 2.5% calcium chloride; and a few hundredths of one percent aluminum metal.

References Cited in the file of this patent

UNITED STATES PATENTS

| | | |
|---|---|---|
| 2,205,735 | Scherer | June 25, 1940 |
| 2,215,812 | Kaplan | Sept. 24, 1940 |
| 2,476,306 | King | July 19, 1949 |
| 2,491,487 | Faulwelter | Dec. 20, 1949 |
| 2,496,226 | Overhoff et al. | Jan. 31, 1950 |

FOREIGN PATENTS

| | | |
|---|---|---|
| 119,828 | Australia | Apr. 11, 1945 |